United States Patent
Kopikare et al.

(10) Patent No.: US 7,599,671 B2
(45) Date of Patent: Oct. 6, 2009

(54) RADAR DETECTION APPARATUS AND METHOD THEREOF

(75) Inventors: Milind Kopikare, Sunnyvale, CA (US); Hui Yao Lin, Fremont, CA (US); James Yee, Fremont, CA (US); Chuong Vu, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 560 days.

(21) Appl. No.: 11/298,017

(22) Filed: Dec. 9, 2005

(65) Prior Publication Data

US 2007/0032211 A1 Feb. 8, 2007

Related U.S. Application Data

(60) Provisional application No. 60/706,388, filed on Aug. 8, 2005.

(51) Int. Cl.
*H04B 17/00* (2006.01)
*H04B 7/00* (2006.01)
(52) U.S. Cl. ............ 455/130; 455/67.13; 455/232.1; 455/226.1; 455/296
(58) Field of Classification Search .......... 455/67.11, 455/136, 138, 227, 232.1, 234.1–234.2, 336, 455/63.1, 67.13, 296; 342/20, 80–92
See application file for complete search history.

(56) References Cited

U.S. PATENT DOCUMENTS

| 6,954,171 | B2 * | 10/2005 | Husted et al. ............ 342/57 |
| 7,155,230 | B2 * | 12/2006 | Tsien ..................... 455/450 |
| 7,263,143 | B1 * | 8/2007 | Rothaar et al. .......... 375/345 |
| 2005/0059364 | A1 * | 3/2005 | Hansen et al. ......... 455/127.4 |

OTHER PUBLICATIONS

Elliot Lab Test Report; Jun. 2, 2005; 7 pages.
ETSI EN 301 893, V1.2.3 (Aug. 2003); Broadband Radio Access Networks (BRAN); 5 GHz high performance RLAN; Harmonized EN covering essential requirements of article 3.2 of R&TTE Directive; 2003; 43 pages.

* cited by examiner

*Primary Examiner*—Simon D Nguyen

(57) ABSTRACT

A wireless network device includes a signal receiving module that receives an RF signal, and a signal processing module that includes an automatic gain control (AGC) module and that generates control signals when a gain of the AGC module changes based on the RF signal. The network device includes a control module that selectively measures N time intervals between one of adjacent and non-adjacent control signals, wherein N is an integer greater than 1, and that selectively determines that the RF signal is a radar signal when the N time intervals are substantially equal.

32 Claims, 13 Drawing Sheets

RADAR DETECTION APPARATUS AND METHOD THEREOF

CROSS-REFERENCE TO RELATED APPLICATIONS

This application claims the benefit of U.S. Provisional Application Ser. No. 60/706,388, filed on Aug. 8, 2005. The disclosure of the above application is incorporated herein by reference in its entirety.

FIELD OF THE INVENTION

The present invention relates to radar systems, and more particularly to radar detection algorithms.

BACKGROUND OF THE INVENTION

Radar is an acronym for Radio Detection and Ranging. The term "radio" refers to the use of radio frequency (RF) waves. The detection and ranging part of the acronym is accomplished by timing a delay between transmission of an RF pulse and its subsequent return. If the time delay is $\Delta t$, then the range may be determined by the simple formula:

$$R = c\Delta t/2$$

where $c = 3 \times 10^8$ m/s and is the speed of light. The factor of two in the formula accounts for the return trip.

Referring now to FIG. 1, the common radar carrier modulation or pulse train and other radar parameters are shown. The pulse width (PW) is the duration of the radar pulse. The rest time (RT) is the interval between pulses. The pulse repetition time (PRT) is the interval between the start of one pulse and the start of a subsequent pulse. PRT is equal to the sum, PRT=PW+RT. The pulse repetition frequency (PRF) is the number of pulses transmitted per second and is equal to the inverse of PRT. The radio frequency (RF) is the frequency of the carrier wave that is being modulated to form the pulse train.

Military organizations use radar communication systems. Until recently, military radar communication systems enjoyed nearly interference-free communication. In recent years, however, wireless network communications have proliferated. As a result, wireless network signals may interfere with military radar communications. Interference between publicly used wireless networks and military radar systems is undesirable for security reasons.

Based on the disclosures by the military organizations, IEEE has defined the IEEE 802.11h specification, which is incorporated herein by reference. IEEE 802.11h attempts to limit wireless networks and wireless network devices from interfering with radar systems. Support for IEEE 802.11h is required in all IEEE 802.11a compliant access points and client stations to avoid interference with military radar. IEEE 802.11h uses two techniques to reduce radio interference: Dynamic Frequency Selection (DFS) and Transmit Power Control (TPC).

When a device that employs DFS detects other devices on the same radio channel, the device switches to another channel if necessary. Typically, an AP transmits beacons and informs the client stations that the AP uses DFS. When the client stations detect radar on a channel, the client stations notify the AP. Based on this information, the AP uses DFS to select the best channel for network communications that will not interfere with radar.

TPC reduces interference by limiting the transmit power of the network devices to a minimum level that is necessary to reach a farthest client station. Maximum power limits may be set within the AP and are imposed on the client stations that associate with that AP. By limiting the transmit power of client stations, TPC may limit interference with radar.

Once a wireless network device detects radar, the network should stop using that channel within a predetermined time, such as 10 seconds. Communication on that channel may be blocked for a subsequent period of time, such as half-an-hour. Some network devices may falsely detect radar on a channel. For example, a network device may incorrectly conclude that noise such as a signal generated by a microwave appliance or other device is a radar signal. The network will unnecessarily block the channel despite the fact that the detected signal is not a radar signal. As false detections increase, additional channels may be blocked and fewer channels will remain available for network communications. This can significantly degrade network performance.

SUMMARY OF THE INVENTION

A wireless network device comprises a signal receiving module that receives a radio frequency (RF) signal, a signal processing module that comprises an automatic gain control (AGC) module and that generates control signals when a gain of the AGC module changes based on the RF signal, and a control module that selectively measures N time intervals between one of adjacent and non-adjacent control signals, wherein N is an integer greater than 1, and that selectively determines that the RF signal is a radar signal when the N time intervals are substantially equal.

In other features, the BBP generates one of the control signals when the gain of the AGC module transitions from a first magnitude to a second magnitude that is less than a predetermined value and the first magnitude, and from the second magnitude to a magnitude greater than the predetermined value within a predetermined period. The BBP selectively generates one of the control signals when the gain of the AGC module transitions M number of times within the predetermined period, wherein M is an integer greater than 1.

In yet other features, the control module determines that the RF signal is not a radar signal when $N^{th}$ time interval is not substantially equal to $(N+1)^{th}$ time interval. The N time intervals differ by a predetermined magnitude that is less than five percent of a period of a radar signal. The radar signal has a predetermined pulse width and a predetermined pulse repetition frequency. The RF signal is received on a channel and the control module generates a radar detection signal when the radar signal is detected on the channel. The control module selectively transmits the radar detection signal to another network device when the radar signal is detected on the channel.

In other features, a client station comprises the network device wherein the client station operates in one of an infrastructure mode and an ad hoc mode. An access point comprises the network device. The network device further comprises a medium access control (MAC) module wherein the control module is selectively implemented by the MAC module. The signal receiving module comprises one of a RF receiver and a RF transceiver, and the signal processing module comprises a base band processor.

A computer program executed by a processor comprises receiving an RF signal, generating control signals when a gain of an automatic gain control (AGC) module changes based on the RF signal, and selectively measuring N time intervals between one of adjacent and non-adjacent control signals, wherein N is an integer greater than 1, and selectively determining that the RF signal is a radar signal when the N time intervals are substantially equal.

In another feature, the computer program further comprises generating one of the control signals when the gain of the AGC module transitions from a first magnitude to a second magnitude that is less than a predetermined value and the first magnitude, and from the second magnitude to a magnitude greater than the predetermined value within a predetermined period.

In other features, the computer program further comprises selectively generating one of the control signals when the gain of the AGC module transitions M number of times within the predetermined period, wherein M is an integer greater than 1. The computer program further comprises determining that the RF signal is not a radar signal when $N^{th}$ time interval is not substantially equal to $(N+1)^{th}$ time interval. The N time intervals differ by a predetermined magnitude that is less than five percent of a period of a radar signal. The radar signal has a predetermined pulse width and a predetermined pulse repetition frequency. The computer program further comprises receiving the RF signal on a channel and generating a radar detection signal when the radar signal is detected on the channel. The computer program further comprises selectively transmitting the radar detection signal to a network device when the radar signal is detected on the channel. The computer program further comprises implementing the computer program in a client station that operates in one of an infrastructure mode and an ad hoc mode. The computer program further comprises implementing the computer program in an access point. The computer program further comprises selectively implementing the computer program in a medium access control (MAC) module.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
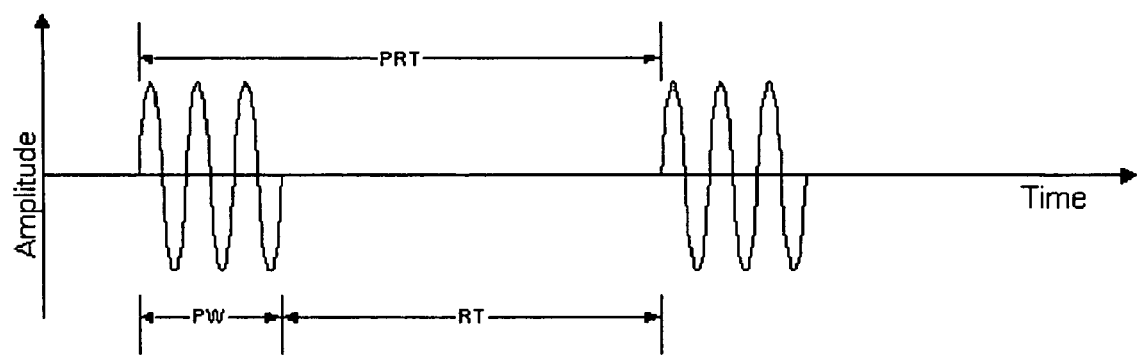
FIG. 1 illustrates radar carrier modulation and radar parameters according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

Figure 2:
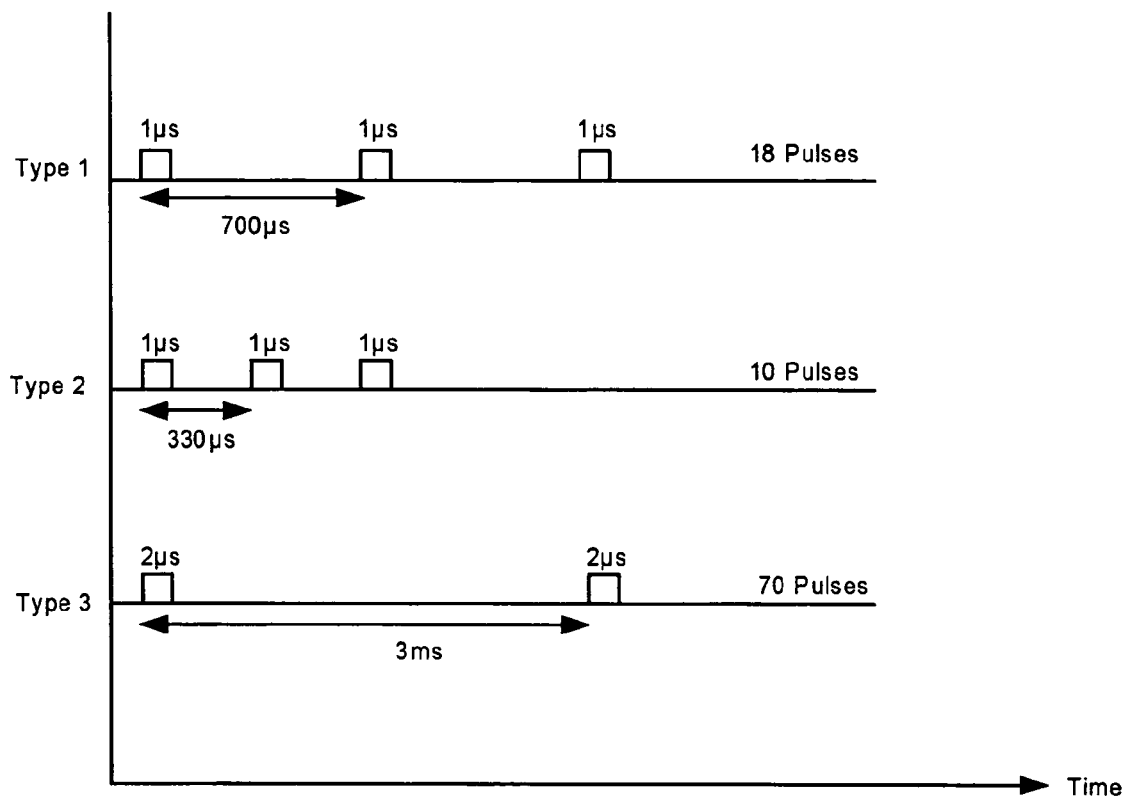
FIG. 2 illustrates different types of radar signals.

Referring now to FIG. 2, exemplary types of radar signals are shown. Type 1 radar signal comprises a burst of 18 pulses with a PW of 1 µs and an RT of 700 µs. Type 2 radar signal comprises a burst of 10 pulses with a PW of 1 µs and an RT of 330 µs. Type 3 radar signal comprises a burst of 70 pulses with a PW of 2 µs and an RT of 3 ms. Regardless of the type of radar signal, the radar pulses occur in a definite sequence. Spurious noise, such as spikes of electromagnetic radiation generated by microwave appliances and other devices, impedes radar pulse detection. Such noise, however, is random. Therefore, a radar sequence may be detected in spite of random noise.

Figure 3A:
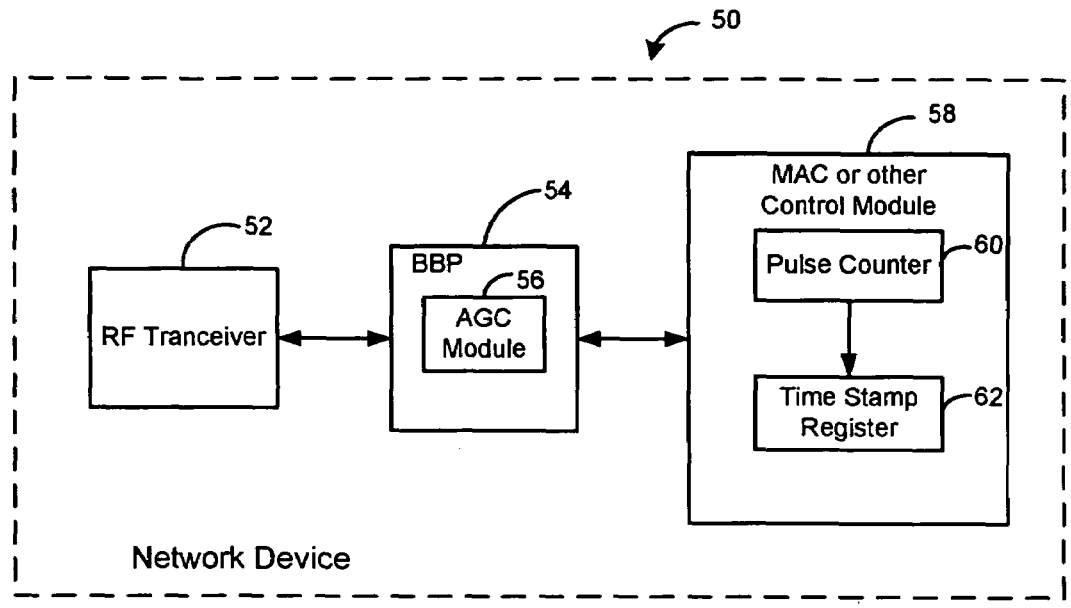
FIG. 3A is a functional block diagram on an exemplary radar detection system in a wireless network device according to the present invention.

Referring now to FIG. 3A, a system 50 for detecting radar is shown. The system 50 may comprise a wireless network device. A radio frequency (RF) transceiver 52 receives RF signals and communicates with a base band processor (BBP) 54. The BBP 54 filters, demodulates, and digitizes the RF signals. The BBP 54 comprises an automatic gain control (AGC) module 56. The gain of the AGC module changes based on the characteristics of signal received. The BBP 54 generates an interrupt signal when the AGC gain drops below a threshold.

A control module 58 analyses interrupts received from the BBP 54 to determine whether the received signal is radar. The control module 58 may be integrated with and/or implemented by a media access control (MAC) module. The control module 58 utilizes a pulse counter 60 that counts interrupts and a time stamp register 62 that registers the time of each interrupt. The control module 58 identifies the signal as a radar signal if a predetermined number of adjacent and/or non-adjacent interrupts occur at substantially equal time intervals.

The RF transceiver 52 receives signals that may comprise packets of wireless network data, radar signals, and/or noise signals. When a signal is received, the gain of the automatic gain control (AGC) module 56 changes from a normal value to a lower value. After a time period, however, the gain returns to the normal value. The magnitude by which the gain changes and the time in which the gain returns to the normal value depend on the characteristics of the signal.

Figure 3B:
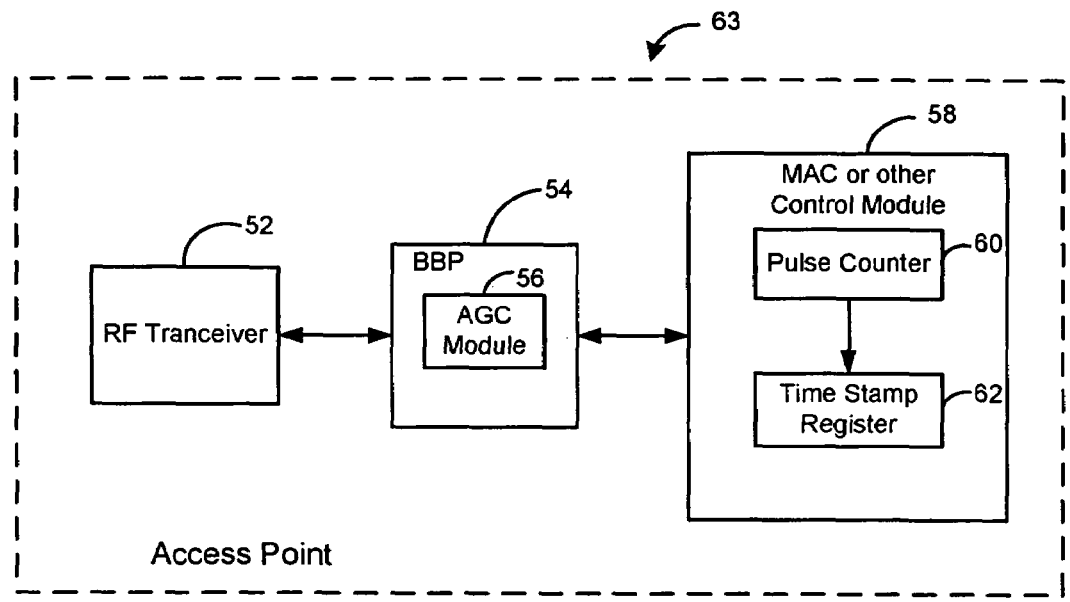
FIG. 3B is a functional block diagram on an exemplary radar detection system in a wireless access point according to the present invention.
Figure 3C:
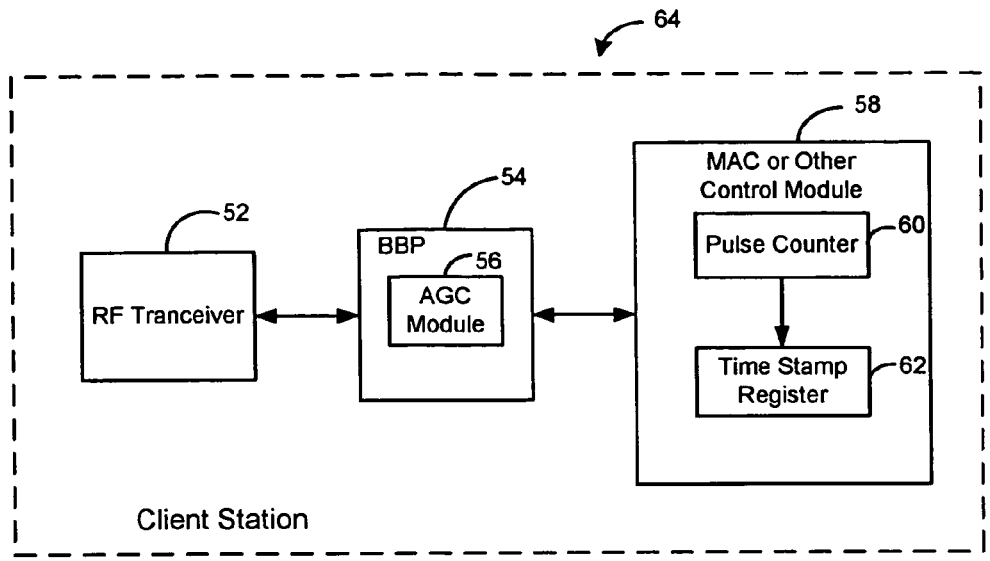
FIG. 3C is a functional block diagram on an exemplary radar detection system in a wireless client station according to the present invention.
Figure 3D:
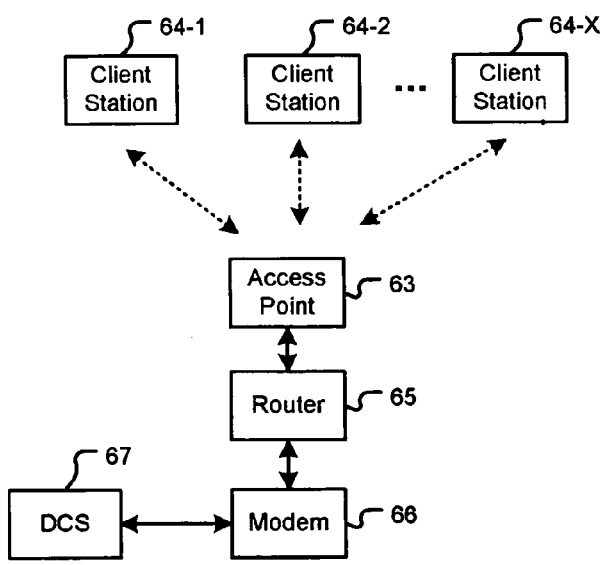
FIG. 3D is a functional block diagram of an exemplary infrastructure network.
Figure 3E:
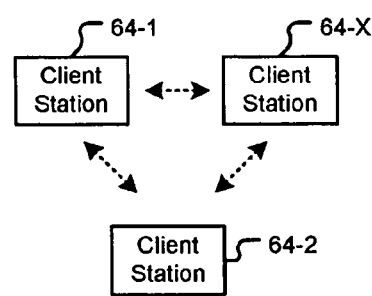
FIG. 3E is a functional block diagram of an ad hoc network.

Referring now to FIGS. 3B-3E, various exemplary implementations are shown. In FIG. 3B, an exemplary radar detection system is shown in a wireless access point 63. In FIG. 3C, an exemplary radar detection system is shown in a wireless client station 64. In FIG. 3D, an infrastructure network is shown with wireless client stations 64-1, 64-2, . . . , and 64-X that communicate with an access point 63. The access point 63 may communicates with a router 65. A modem 66 may provide access to a distributed communications system (DCS) 67 such as the Internet, a wide area network (WAN), and/or a local area network (LAN). In FIG. 3E, the client stations 64-1, 64-2, . . . , and 64-X are configured in an ad hoc mode.

Figure 4A:
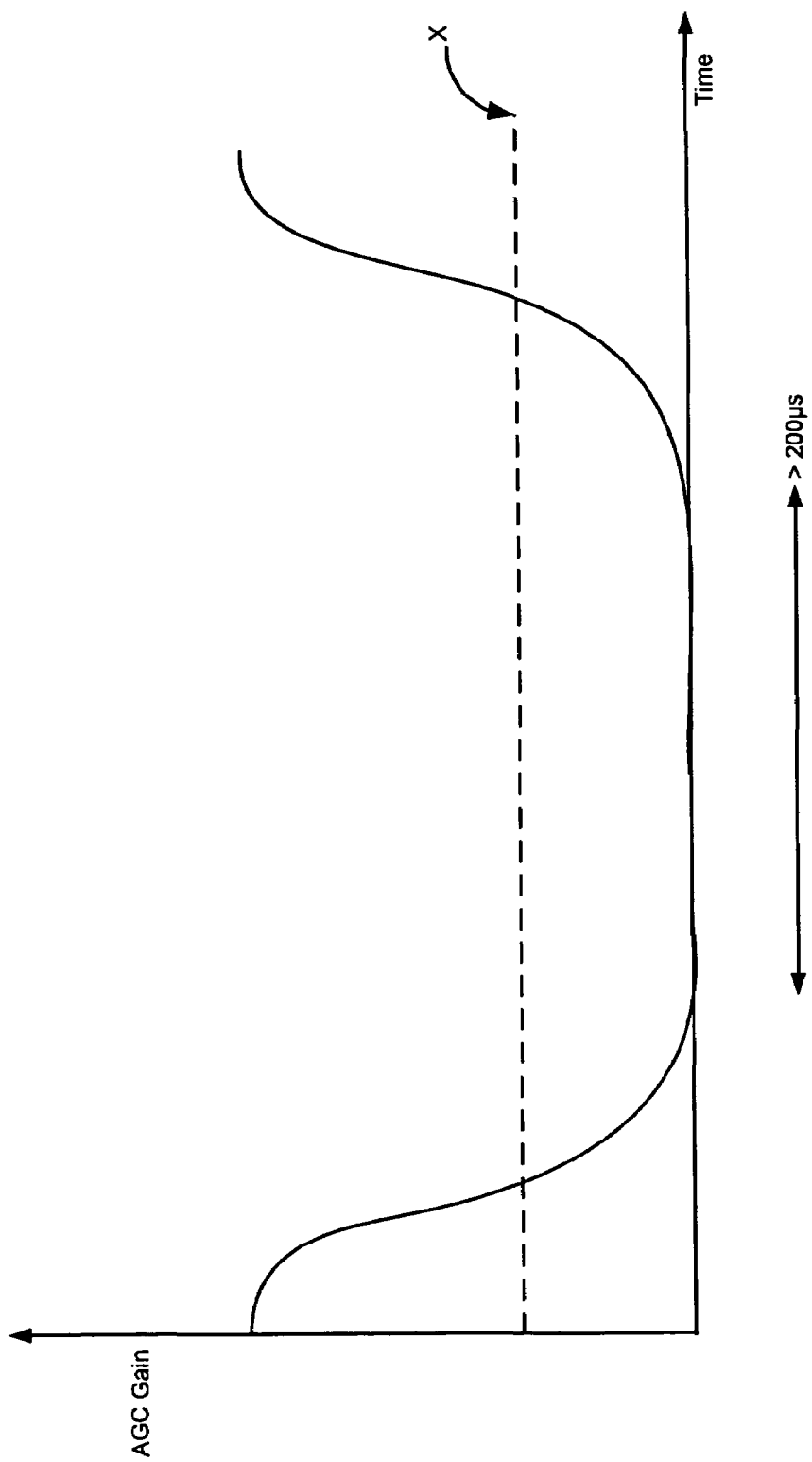
FIG. 4A is a graph of AGC gain as a function of time that shows a drop in the AGC gain when a base band processor receives a wireless data packet.
Figure 4B:
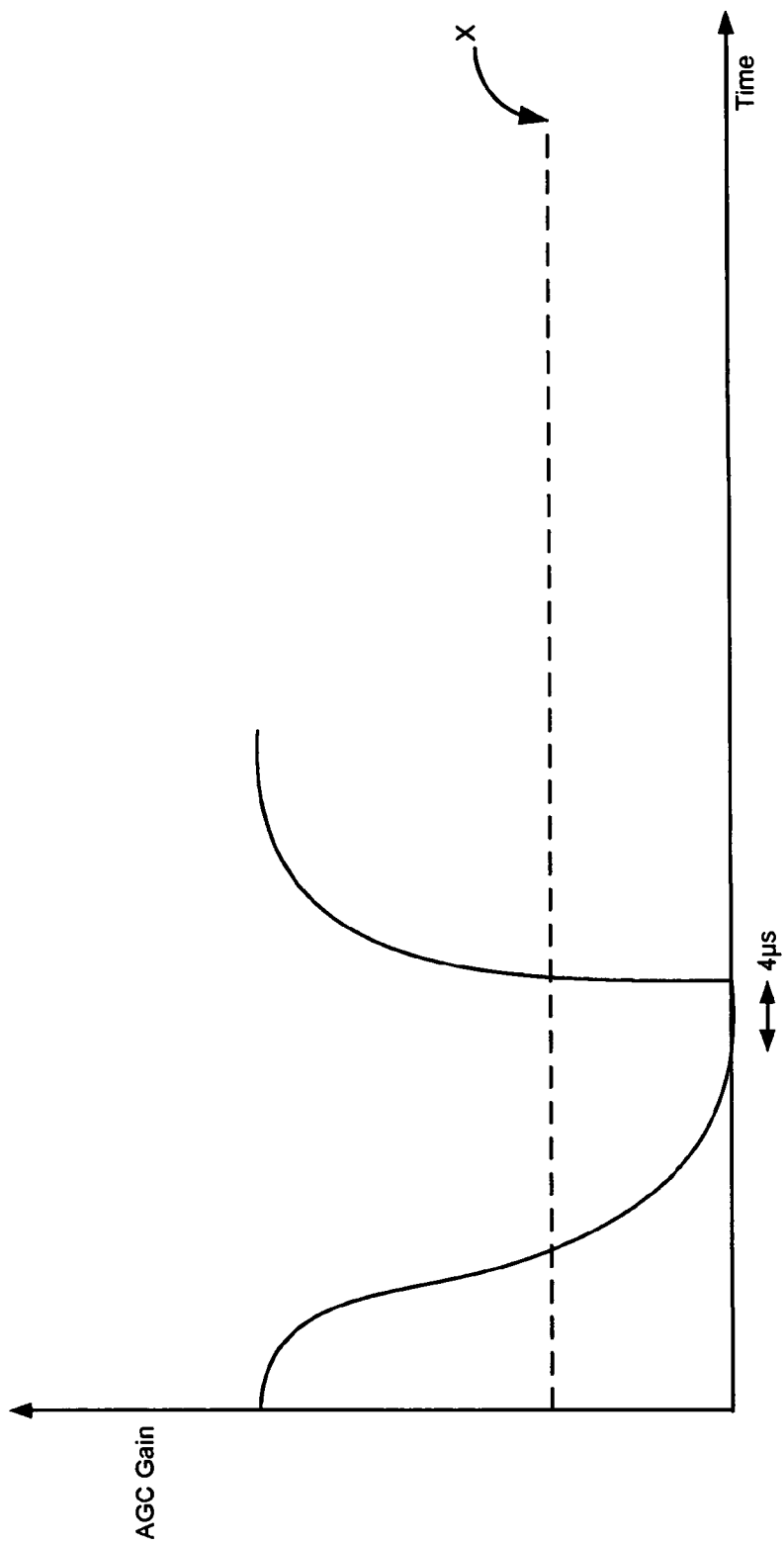
FIG. 4B is a graph of AGC gain as a function of time that shows a drop in the AGC gain when a base band processor receives a radar signal.

Referring now to FIG. 4A, the gain drops to zero and takes at least 200 μs to return to normal if the received signal is a wireless network data packet that is at least 100 μs wide. On the other hand, the gain drops to zero and may take at most 4 μs to return to normal as shown in FIG. 4B if the received signal is a radar pulse that is 2 μs wide (for example, radar type 3 in FIG. 2). Thus, the response of the gain to a wireless network data packet and/or a radar signal is predictable.

Figure 4C:
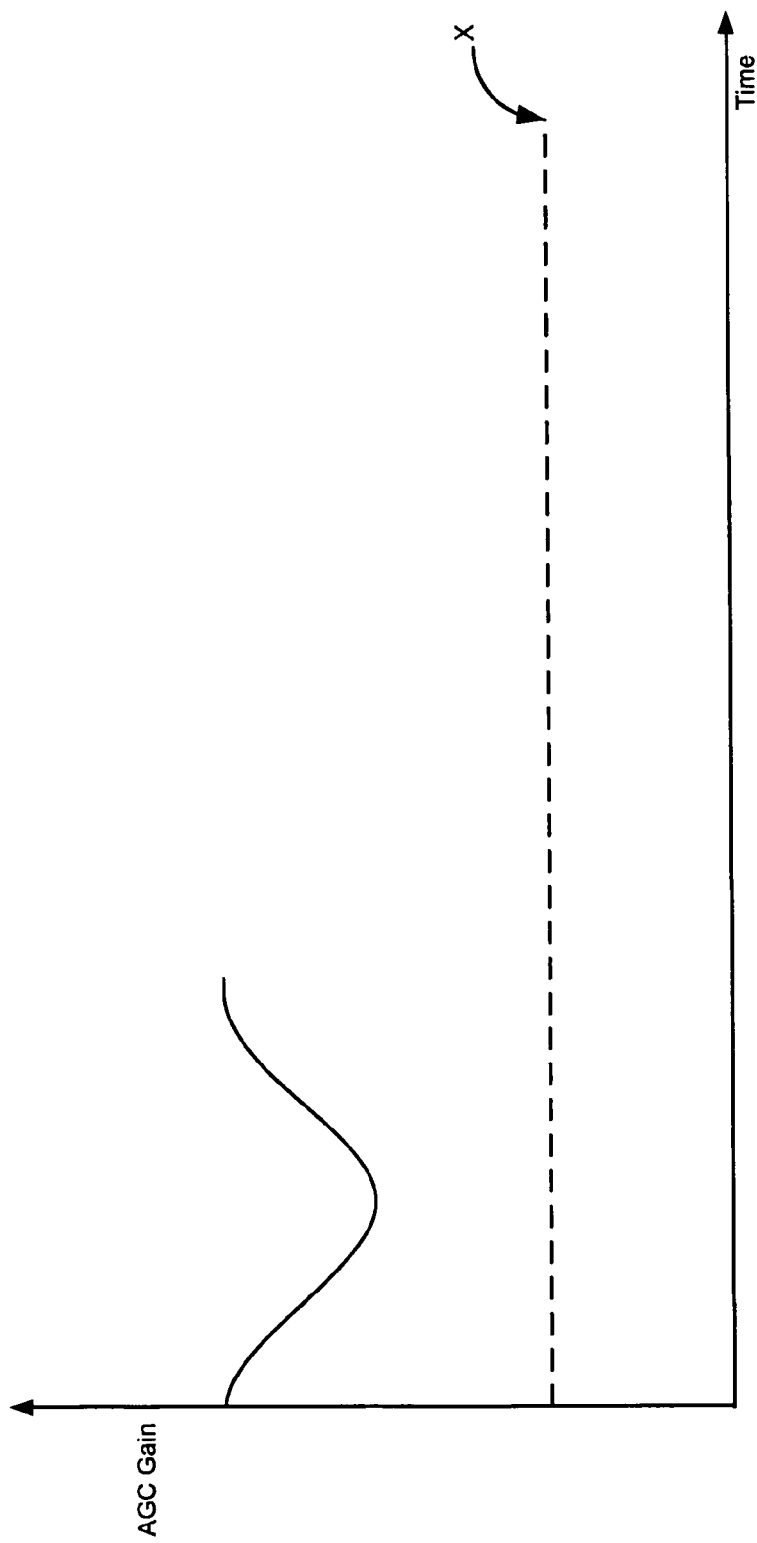
FIG. 4C is a graph of AGC gain as a function of time that shows a drop in the AGC gain when a base band processor receives a noise pulse in the form of a spike.
Figure 4D:
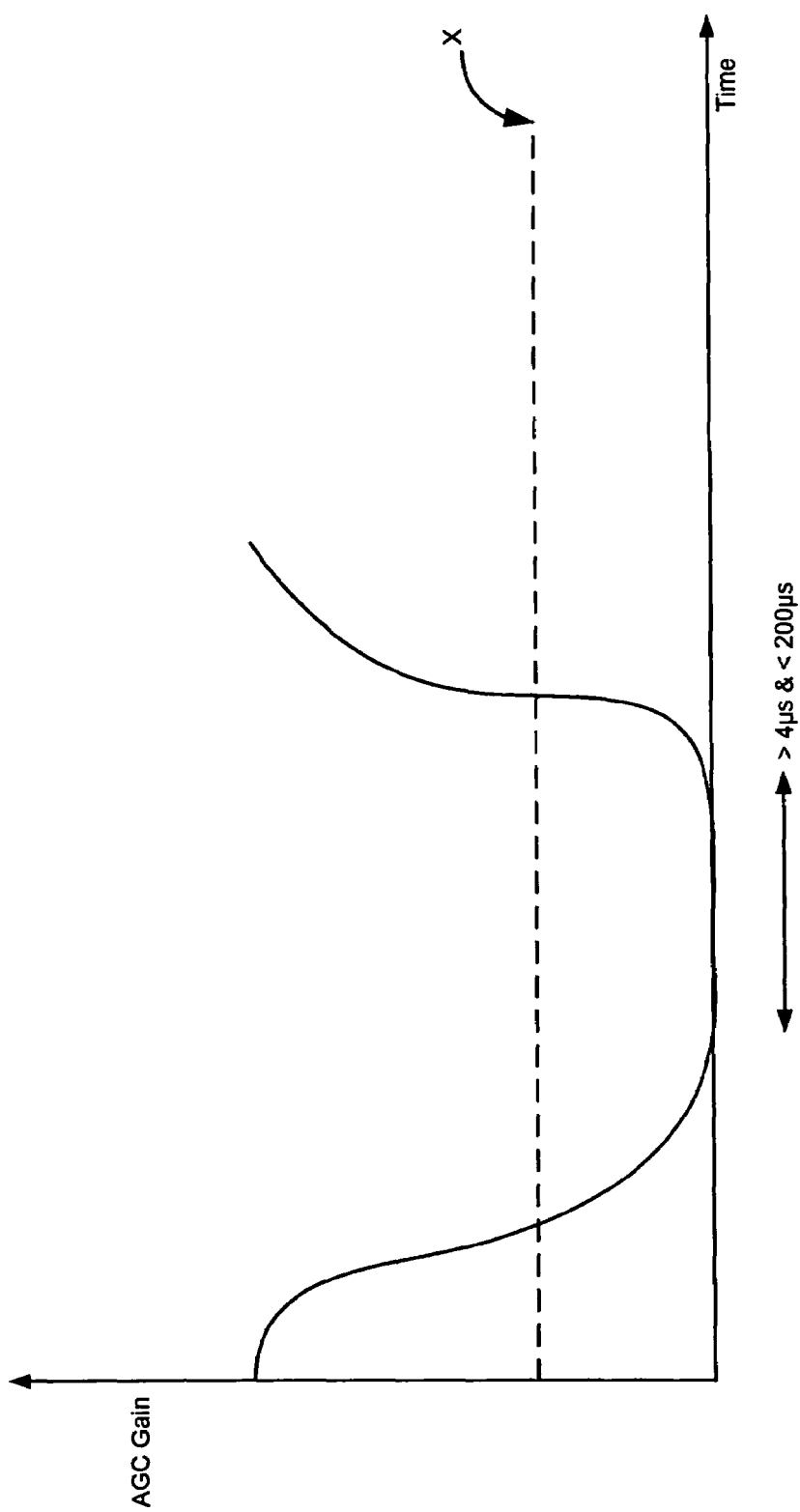
FIG. 4D is a graph of AGC gain as a function of time that shows a drop in the AGC gain when a base band processor receives a random noise signal.

The gain, however, responds differently to noise signals than to either wireless network data packet and/or a radar signal. For example, the gain may drop only slightly and may quickly return to normal depending on the amplitude and width of the noise pulse as shown in FIG. 4C if the received signal is a noise pulse in the form of a spike. On the other hand, the gain may drop to zero but may return to normal in more than 4 μs and less than 200 μs as shown in FIG. 4D if the received signal is a random noise pulse.

Therefore, the BBP 54 can be programmed to generate an interrupt only if the AGC gain drops below a predetermined threshold X and if the gain returns to normal in less than a predetermined time. The predetermined time may be equal to twice the pulse width of the widest radar pulse (for example, 4 μs to detect all the radar types in FIG. 2). Specifically, the BBP 54 can be programmed to not generate an interrupt for situations illustrated by FIGS. 4C and 4D. This selective interrupt generation technique helps in avoiding false radar detections. Additionally, this technique conserves resources such as processing power, memory, electrical power, etc., in a wireless network device.

When the control module 58 receives an interrupt, a pulse counter 60 is triggered to count the interrupt. Each interrupt represents a pulse that is received by the system 50 and that may be a radar pulse. A time stamp register 62 records the time stamp for each interrupt. To decide whether the received signal is indeed a radar signal, the control module 58 compares the time difference between a predetermined number of successive time stamps. If the time stamps occur at substantially equal time intervals, the control module 58 concludes that the received signal is a radar signal.

Specifically, the control module 58 calculates the time difference between a predetermined number of successive time stamps. For example, if interrupt 1 is detected at time $t_1$, interrupt 2 is detected at time $t_2$, interrupt 3 is detected at time $t_3$, etc., then the control module 58 calculates the time differences $(t_2-t_1)$, $(t_3-t_2)$ etc. The control module 58 then determines whether the time differences are substantially equal. The control module 58 concludes that the signal detected is a radar signal if the time differences are substantially equal.

In use, when a stream of radar pulses is received by the RF transceiver 52, the AGC gain drops similar to the drop shown in FIG. 4B for each pulse. The BBP 54 generates an interrupt for each pulse. The control module 58 triggers the pulse counter 60 upon receiving each interrupt. The pulse counter 60 counts each interrupt. The time stamp register 62 registers the time stamp for each interrupt. The control module 58 calculates the time difference between N successive time stamps and generates (N−1) time difference values. The control module 58 concludes that the received signal is a radar signal if the (N−1) time differences are substantially equal within a predetermined tolerance.

For even faster convergence and for a quicker determination of false detection of signals, a further optimization may be utilized. When the control module 58 calculates the time difference between an incoming pulse and a pulse preceding that pulse, the control module 58 compares this time difference with a prior time difference. Specifically, the control module 58 compares whether $(t_i-t_{i-1})$ and $(t_{i-1}-t_{i-2})$ are within a predetermined tolerance of each other. If true, the control module 58 continues with further checking. If false, the control module 58 resets the pulse counter 60 and starts checking again. In the event that the received signal is a noise signal, the control module 58 does not wait to acquire N signals before determining that the received signal is not a radar signal.

Notably, radar pulses occur at regular time intervals, whereas noise pulses generally occur randomly. Consequently, the time difference between radar pulses will be substantially equal, whereas the time difference between noise pulses will not be equal. Therefore, calculating and comparing time differences between approximately five pulses may suffice to determine whether the signal received is a radar signal.

Although radar pulses have a definite frequency, the time difference between successive pulses may not be exactly equal. This is because the RT between the radar pulses may not always be constant. Moreover, the signal processing time, such as interrupt generation, pulse counting, etc., creates an aggregate time delay that requires consideration when comparing the time differences. Therefore, a narrow allowance ±ε in the time differences is added to each time difference. Thus, the time differences $(t_2-t_1)$, $(t_3-t_2)$, etc., may differ by ±ε. Generally, ε may be less than five percent of a period of a radar signal. For example, for type 1 and type 2 radar, ε may be 15 μs, and for type 3 radar, ε may be 30 μs.

Once a client station detects radar, the station informs other client stations (in ad-hoc mode) or the associated AP (in infrastructure mode). In infrastructure mode, the AP broadcasts beacons to inform the stations to use a different radar-free channel instead of the current channel. Some regulations require that the total time of all broadcast transmissions may not exceed a predetermined period such as 200 ms. Therefore, quick and accurate radar detection is important.

Notably, the system 50 for detecting radar recognizes that detecting a radar signal is sufficient because a channel is unusable once radar of any type is detected regardless of the type of radar. Therefore, the system 50 does not necessarily need to determine the type of radar once radar is detected. Instead, the system 50 may only check if a predetermined number of successive pulses occur at substantially equal time intervals to determine whether the received signal is a radar signal.

Radar may also be effectively detected by measuring the time differences between every P pulses instead of successive pulses, where P is an integer greater than 1. In another variation, the BBP 54 may be programmed to generate an interrupt for the control module 58 only after the AGC gain drops below the threshold X a predetermined number of times within a predetermined period. This will allow the control module 58 to perform other functions and better utilize resources such as processing power during the time it is not interrupted by the BBP 54.

The pulse counter 60 and the time stamp register 62 are shown separately for illustrative purposes and may be implemented in the control module 58. Moreover, all or part of the system 50 for detecting radar may be implemented by firmware.

Figure 5:
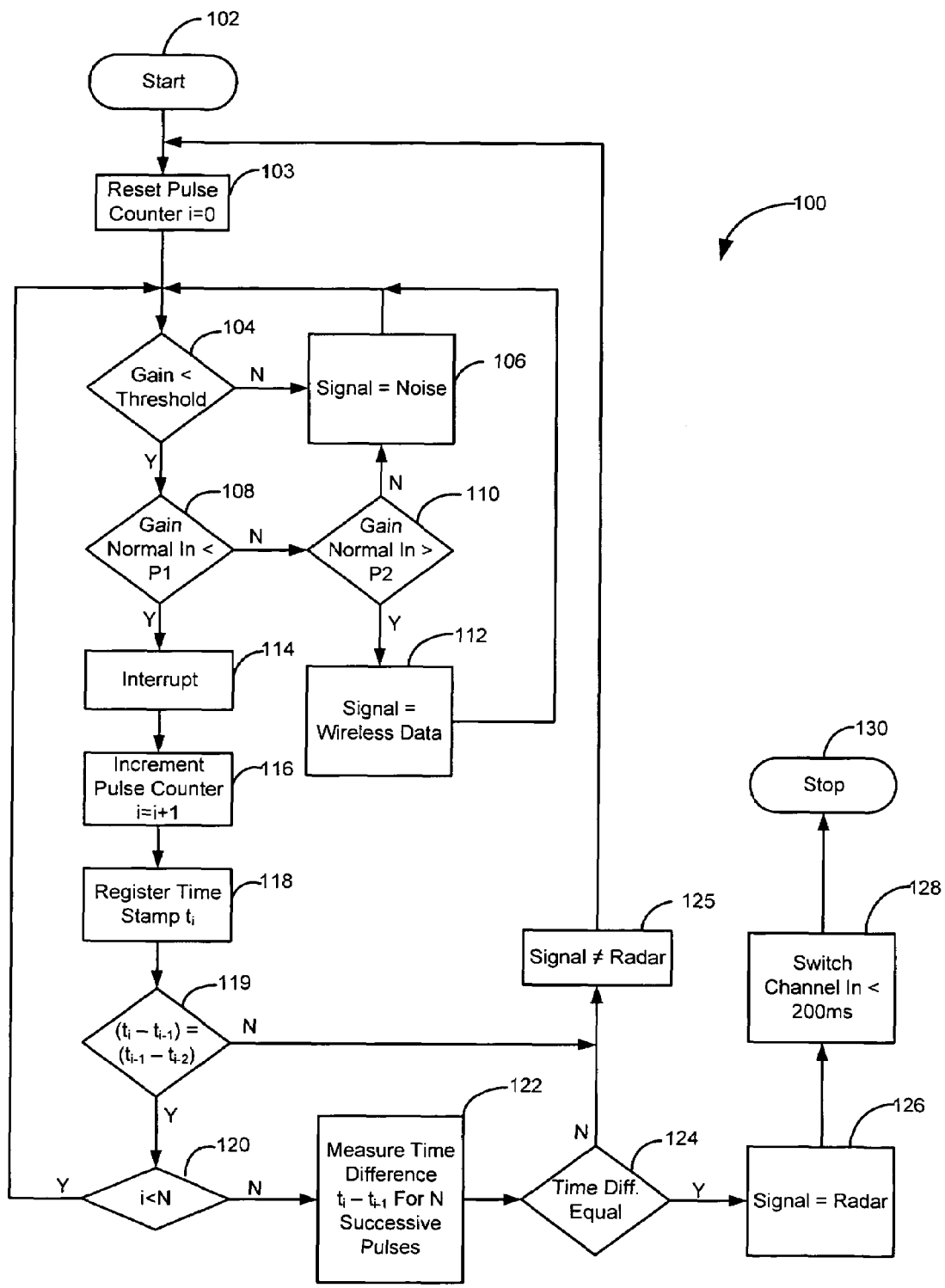
FIG. 5 is a flowchart of an exemplary radar detection method according to the present invention.

Referring now to FIG. 5, a method 100 of detecting radar is shown. The method 100 begins at step 102. In step 103, a pulse counter 60 is reset, (i=0). In step 104, a BBP 54 determines whether a signal received by an RF transceiver 52 has caused a gain of an AGC module 56 to drop below a predetermined threshold X. The signal is ignored as noise in step 106 if the gain has not dropped below the threshold X, and the method 100 returns to step 104.

If the gain has dropped below the threshold X, the BBP 54 determines whether the gain returned to normal in less than a maximum of 4 µs in step 108. If the gain returned to normal in more than 4 µs, the BBP 54 determines whether the gain returned to normal in more than 200 µs in step 110. The signal is ignored as noise in step 106 if the gain returned to normal in less than 200 µs, and the method 100 returns to step 102. The signal is presumed to be normal wireless network data packet in step 112 if the gain returned to normal in more than 200 µs, and the method 100 returns to step 104.

The signal, however, could be radar or noise if the gain returned to normal in less than 4 µs in step 108. In that case, the BBP 54 generates an interrupt in step 114. A control module 58 triggers a pulse counter 60 to increment a pulse count i in step 116. A time stamp register 62 records the time stamp $t_i$ for the detected pulse in step 118.

The control module 58 determines whether the time differences $(t_i-t_{i-1})$ and $(t_{i-1}-t_{i-2})$ are equal within a predetermined tolerance in step 119. If false, the control module 58 determines that the signal is not radar in step 125, and the method 100 returns to step 103. If true, the control module 58 determines whether the pulse count i is less than a predetermined number N in step 120, where N is an integer greater than 1. The method 100 returns to step 104 if the pulse count i is less than N. If the pulse count i is equal to N, the control module 58 measures the time difference between the time stamps of N successive pulses, such as $(t_2-t_1), (t_3-t_2), \ldots, (t_N-t_{N-1})$ etc. in step 122.

The control module 58 compares the time difference between successive time stamps in step 124. For example, the control module 58 compares whether $(t_3-t_2)$ approximately equals $(t_2-t_1)$ and so on. The control module 58 determines that the detected signal is a radar signal in step 126 if the time differences are approximately equal within a predetermined tolerance $\epsilon$. Otherwise, the control module 58 determines that the detected signal is not a radar signal in step 125, and the method 100 returns to step 103. For radar signals shown in FIG. 2, $\epsilon$ may equal 15 µs for type 1 and type 2 radar signals and 30 µs for type 3 radar signal.

If the detected signal is confirmed to be a radar signal, the client station that detected the radar transmits the information over the network that it detected radar on the channel. The client station transmits the information to an associated AP if the network operates in infrastructure mode or to other stations in the network if the network operates in ad-hoc mode. Subsequently, the AP (in infrastructure mode) broadcasts to all client stations in the network the information about a new channel that may be used for communication in step 128. The method 100 ends in step 130.

The present invention is highly scalable as opposed to traditional approaches, which are very specific to the particular type of radar pulse. The present invention employs the periodic and time invariant nature of a radar pulse and the random nature of noise signals for successful radar determination. With different countries introducing their own radar pulse determination requirements, the number of types of radar pulses that the wireless network device will need to determine may increase. This scheme provides a single unified method for identifying radar pulses that may be introduced in the future.

Figure 6B:
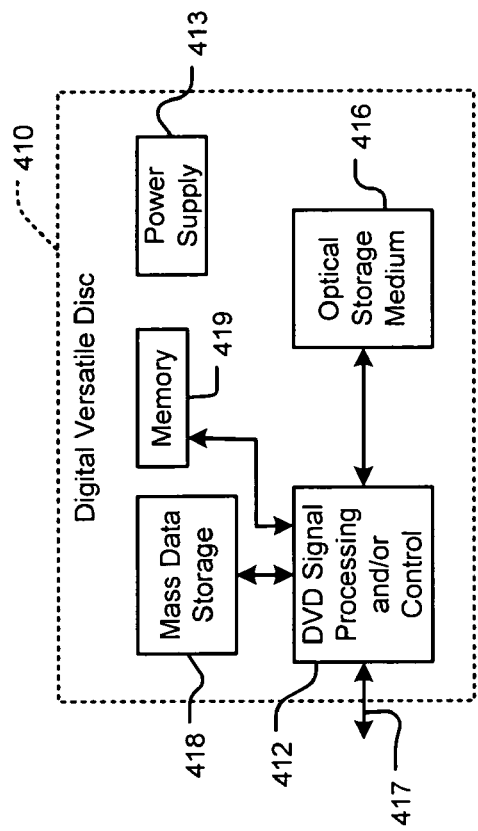
FIG. 6B is a functional block diagram of a digital versatile disk (DVD)
Figure 6A:
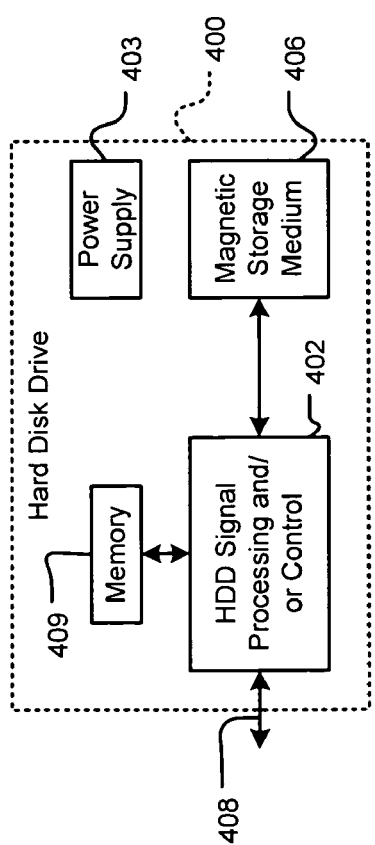
FIG. 6A is a functional block diagram of a hard disk drive.

Referring now to FIGS. 6A-6G, various exemplary implementations of the present invention are shown. Referring now to FIG. 6A, the present invention can be implemented in a hard disk drive 400. The present invention may be implemented in either or both signal processing and/or control circuits, which are generally identified in FIG. 6A at 402. In some implementations, the signal processing and/or control circuit 402 and/or other circuits (not shown) in the HDD 400 may process data, perform coding and/or encryption, perform calculations, and/or format data that is output to and/or received from a magnetic storage medium 406.

The HDD 400 includes a power supply 403 and may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM) and/or other suitable electronic data storage.

Referring now to FIG. 6B, the present invention can be implemented in a digital versatile disc (DVD) drive 410. The present invention may be implemented in either or both signal processing and/or control circuits, which are generally identified in FIG. 6B at 412, and mass data storage 418 of the DVD drive 410. The signal processing and/or control circuit 412 and/or other circuits (not shown) in the DVD 410 may process data, perform coding and/or encryption, perform calculations, and/or format data that is read from and/or data written to an optical storage medium 416. In some implementations, the signal processing and/or control circuit 412 and/or other circuits (not shown) in the DVD 410 can also perform other functions such as encoding and/or decoding and/or any other signal processing functions associated with a DVD drive.

The DVD drive 410 includes a power supply 413 and may communicate with an output device (not shown) such as a computer, television or other device via one or more wired or wireless communication links 417. The DVD 410 may communicate with mass data storage 418 that stores data in a nonvolatile manner. The mass data storage 418 may include a hard disk drive (HDD). The HDD may have the configuration shown in FIG. 6A. The HDD may be a mini HDD that includes one or more platters having a diameter that is smaller than approximately 1.8". The DVD 410 may be connected to memory 419 such as RAM, ROM, low latency nonvolatile memory such as flash memory and/or other suitable electronic data storage.

Figure 6D:
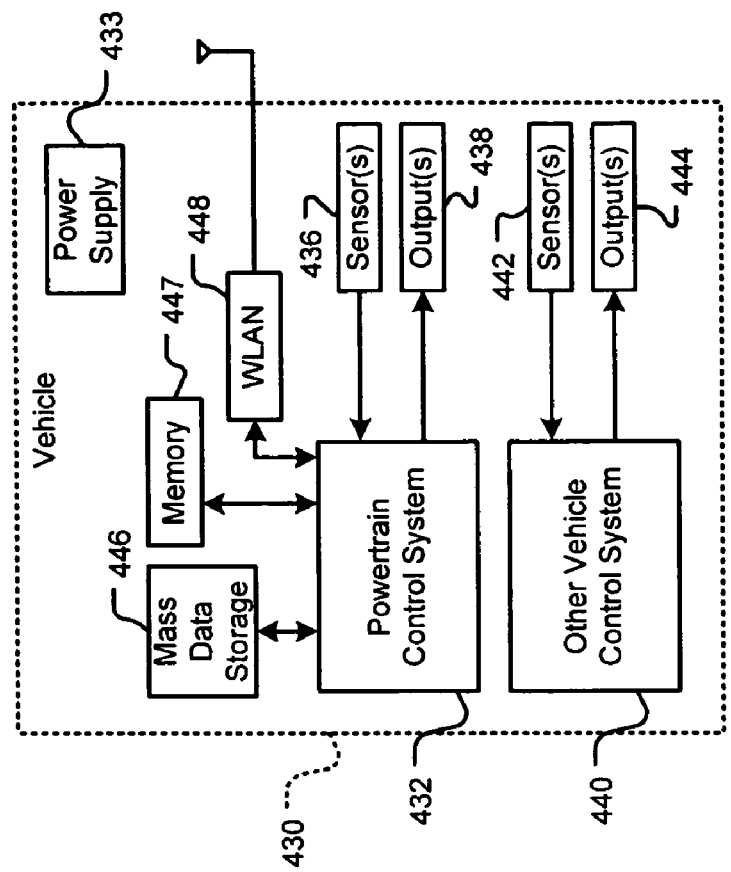
FIG. 6D is a functional block diagram of a vehicle control system.
Figure 6C:
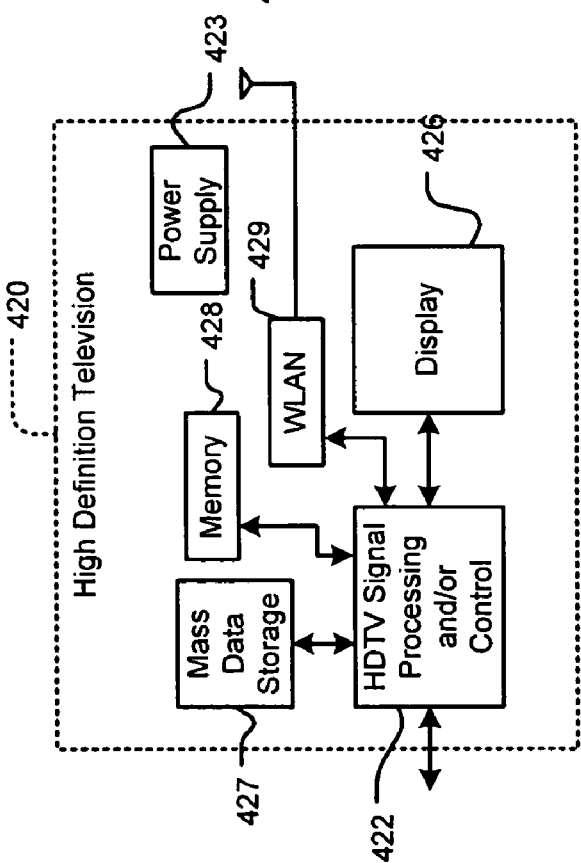
FIG. 6C is a functional block diagram of a high definition television.

Referring now to FIG. 6C, the present invention can be implemented in a high definition television (HDTV) 420. The present invention may be implemented in either or both signal processing and/or control circuits, which are generally identified in FIG. 6C at 422, and mass data storage 427 of the HDTV 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 includes a power supply 423 and may communicate with mass data storage 427 that stores data in a nonvolatile manner such as optical and/or magnetic storage devices. At least one HDD may have the configuration shown in FIG. 9A and/or at least one DVD may have the configuration shown in FIG. 6B. The HDD may be a mini HDD that includes one or more platters having a diameter that is smaller than approximately 1.8". The HDTV. 420 may be connected to memory 428 such as RAM, ROM, low latency nonvolatile memory such as flash memory and/or other suitable electronic data storage. The HDTV 420 also may support connections with a WLAN via a WLAN network interface 429.

Referring now to FIG. 6D, the present invention may be implemented in a vehicle control system or vehicle 430, which includes a power supply 433 and a mass data storage 446. In some implementations, the present invention may implement a powertrain control system 432 that receives inputs from one or more sensors 436 such as temperature sensors, pressure sensors, rotational sensors, airflow sensors and/or any other suitable sensors and/or that generates one or more output control signals or output(s) 438 such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 6E:
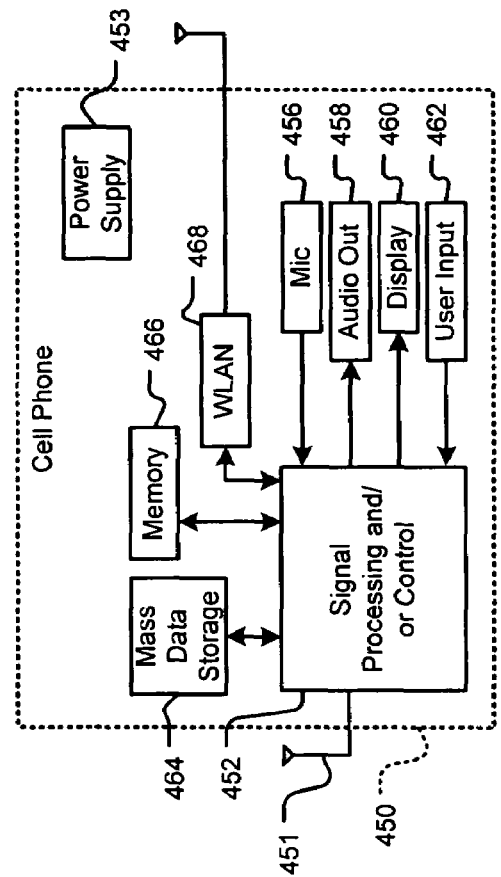
FIG. 6E is a functional block diagram of a cellular phone.

Referring now to FIG. 6E, the present invention can be implemented in a cellular phone 450 that may include a cellular antenna 451. The present invention may implement and/or be implemented in either or both signal processing and/or control circuits, which are generally identified in FIG. 6E at 452, and mass data storage 464 of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 includes a power supply 453 and may communicate with mass data storage 464 that stores data in a nonvolatile manner such as optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 6F:
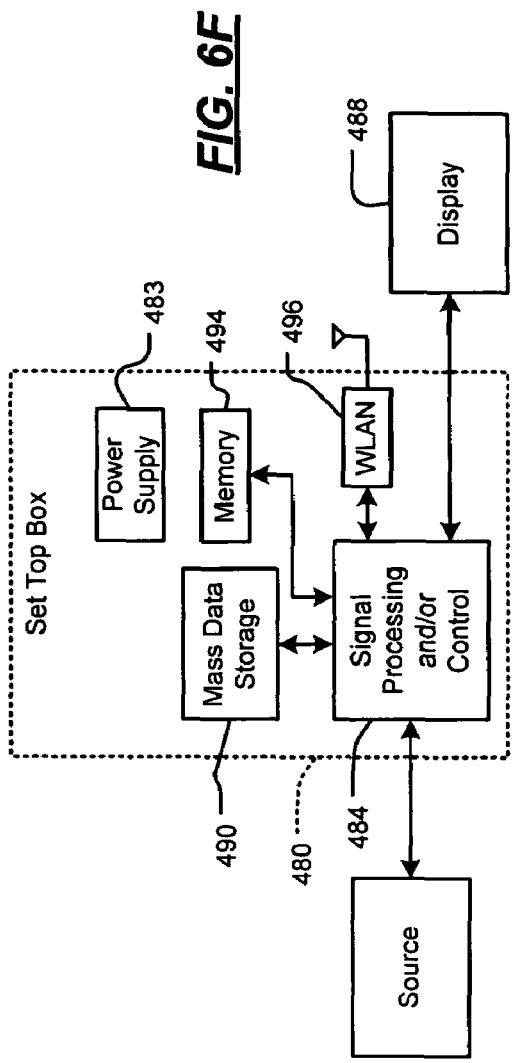
FIG. 6F is a functional block diagram of a set top box.

Referring now to FIG. 6F, the present invention can be implemented in a set top box 480. The present invention may be implemented in either or both signal processing and/or control circuits, which are generally identified in FIG. 6F at 484, and mass data storage 490 of the set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 includes a power supply 453 and may communicate with mass data storage 490 that stores data in a nonvolatile manner. The mass data storage 490 may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 6G:
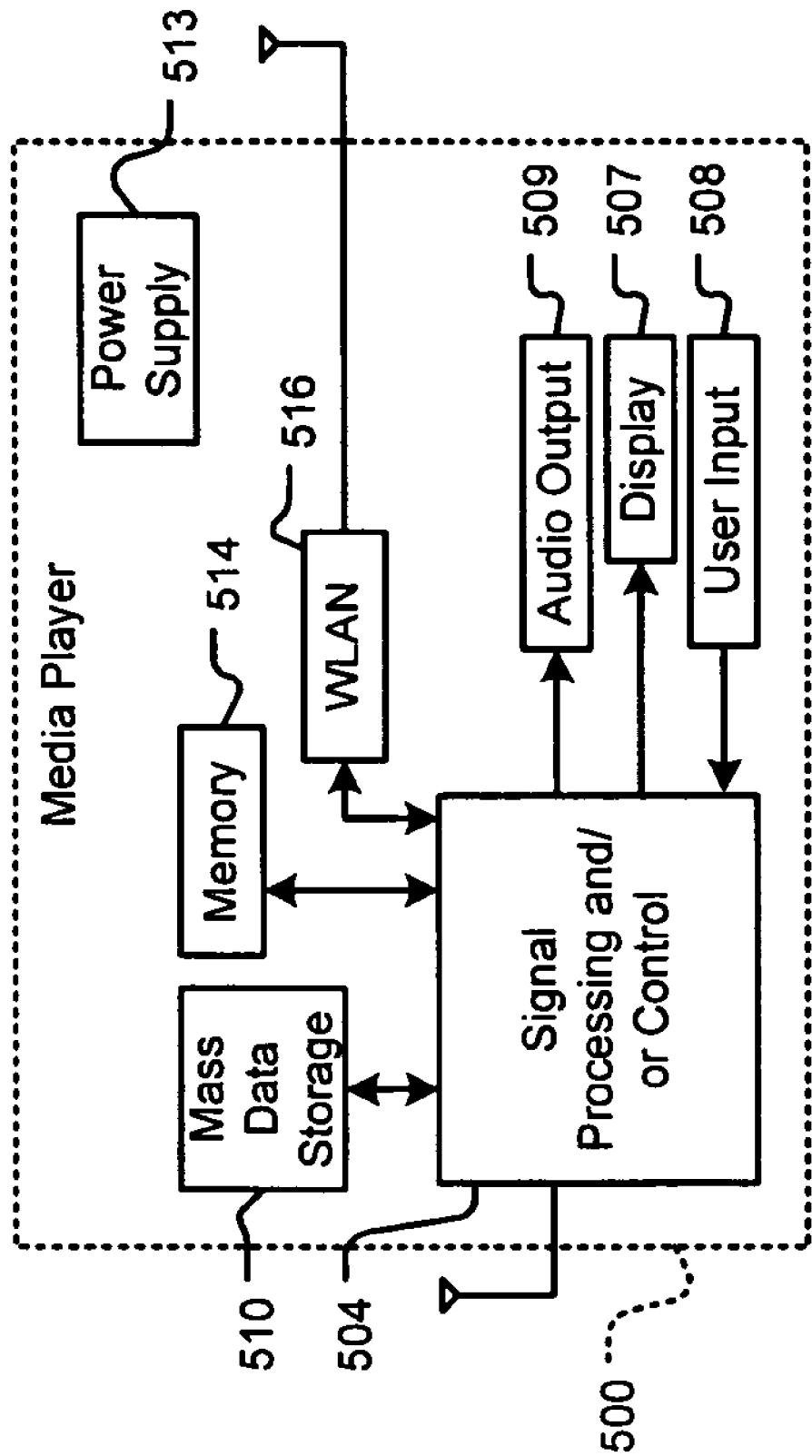
FIG. 6G is a functional block diagram of a media player.

Referring now to FIG. 6G, the present invention can be implemented in a media player 500. The present invention may be implemented in either or both signal processing and/or or control circuits, which are generally identified in FIG. 6G at 504, and mass data storage 510 of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 includes a power supply 513 and may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A wireless network device comprising:
   a signal receiving module that receives a radio frequency (RF) signal;
   a signal processing module that comprises an automatic gain control (AGC) module, and that generates control signals when a gain of said AGC module changes based on said RF signal; and
   a control module that selectively measures N time intervals between one of adjacent and non-adjacent ones of said control signals, wherein N is an integer greater than 1, and that selectively determines that said RF signal is a radar signal when said N time intervals are substantially equal,
   wherein said signal processing module generates one of said control signals when said gain of said AGC module transitions from a first magnitude to a second magnitude that is less than a predetermined value and said first magnitude, and from said second magnitude to a magnitude greater than said predetermined value within a predetermined period.

2. The wireless network device of claim 1, wherein said signal processing module selectively generates one of said control signals when said gain of said AGC module transitions M number of times within said predetermined period, wherein M is an integer greater than 1.

3. The wireless network device of claim 1, wherein said control module determines that said RF signal is not a radar signal when $N^{th}$ time interval is not substantially equal to $(N+1)^{th}$ time interval.

4. The wireless network device of claim 1, wherein said N time intervals differ by a predetermined magnitude that is less than five percent of a period of a radar signal.

5. The wireless network device of claim 1, wherein said radar signal has a predetermined pulse width and a predetermined pulse repetition frequency.

6. The wireless network device of claim 1, wherein said RF signal is received on a channel and wherein said control module generates a radar detection signal when said radar signal is detected on said channel.

7. The wireless network device of claim 6 wherein, said control module selectively transmits said radar detection signal to other network devices when said radar signal is detected on said channel.

8. A client station comprising said wireless network device of claim 1, wherein said client station operates in one of an infrastructure mode and an ad hoc mode.

9. An access point comprising said wireless network device of claim 1.

10. The wireless network device of claim 1 further comprising a medium access control (MAC) module wherein said control module is selectively implemented by said MAC module.

11. The wireless network device of claim 1, wherein said signal receiving module comprises one of a RF receiver and a RF transceiver, and wherein said signal processing module comprises a base band processor.

12. A method for detecting radar, comprising:
    receiving a radio frequency (RF) signal;
    generating control signals when a gain of an automatic gain control (AGC) module changes based on said RF signal;
    selectively measuring N time intervals between one of adjacent and non-adjacent ones of said control signals, wherein N is an integer greater than 1, and selectively determining that said RF signal is a radar signal when said N time intervals are substantially equal; and
    generating one of said control signals when said gain of said AGC module transitions from a first magnitude to a second magnitude that is less than a predetermined value and said first magnitude, and from said second magnitude to a magnitude greater than said predetermined value within a predetermined period.

13. The method of claim 12 further comprising selectively generating one of said control signals when said gain of said AGC module transitions M number of times within said predetermined period, wherein M is an integer greater than 1.

14. The method of claim 12 further comprising determining that said RF signal is not a radar signal when $N^{th}$ time interval is not substantially equal to $(N+1)^{th}$ time interval.

15. The method of claim 12, wherein said N time intervals differ by a predetermined magnitude that is less than five percent of a period of a radar signal.

16. The method of claim 12, wherein said radar signal has a predetermined pulse width and a predetermined pulse repetition frequency.

17. The method of claim 12 further comprising:
    receiving said RF signal on a channel; and
    generating a radar detection signal when said radar signal is detected on said channel.

18. The method of claim 17 further comprising selectively transmitting said radar detection signal to other network devices when said radar signal is detected on said channel.

19. The method of claim 12 further comprising implementing said method in a client station that operates in one of an infrastructure mode and an ad hoc mode.

20. The method of claim 12 further comprising implementing said method in an access point.

21. The method of claim 12 further comprising selectively implementing said method in a medium access control (MAC) module.

22. A wireless network device comprising:
- signal receiving means for receiving a radio frequency (RF) signal;
- signal generating means for generating control signals when a gain of an automatic am control (AGC) module changes based on said RF signal; and
- control means for selectively measuring N time intervals between one of adjacent and non-adjacent ones of said control signals, wherein N is an integer greater than 1, and selectively determining that said RF signal is a radar signal when said N time intervals are substantially equal,
- wherein said signal generating means generates one of said control signals when said gain of said AGC module transitions from a first magnitude to a second magnitude that is less than a predetermined value and said first magnitude, and from said second magnitude to a magnitude greater than said predetermined value within a predetermined period.

23. The wireless network device of claim 22, wherein said signal generating means selectively generates one of said control signals when said gain of said AGC module transitions M number of times within said predetermined period, wherein M is an integer greater than 1.

24. The wireless network device of claim 22, wherein said control means determines that said RF signal is not a radar signal when $N^{th}$ time interval is not substantially equal to $(N+1)^{th}$ time interval.

25. The wireless network device of claim 22, wherein said N time intervals differ by a predetermined magnitude that is less than five percent of a period of a radar signal.

26. The wireless network device of claim 22, wherein said radar signal has a predetermined pulse width and a predetermined pulse repetition frequency.

27. The wireless network device of claim 22, wherein said signal receiving means receives RF signal on a channel and wherein said control means generates a radar detection signal when said radar signal is detected on said channel.

28. The wireless network device of claim 27, wherein said control means selectively transmits said radar detection signal to other network devices when said radar signal is detected on said channel.

29. A client station comprising said wireless network device of claim 22, wherein said client station operates in one of an infrastructure mode and an ad hoc mode.

30. An access point comprising said wireless network device of claim 22.

31. The wireless network device of claim 22 further comprising medium access control (MAC) means for selectively implementing said control means.

32. The wireless network device of claim 22, wherein said signal receiving means comprises one of a RF receiver and a RF transceiver, and wherein said signal processing means comprises a base band processor.

* * * * *